US006996268B2

(12) United States Patent
Megiddo et al.

(10) Patent No.: US 6,996,268 B2
(45) Date of Patent: Feb. 7, 2006

(54) SYSTEM AND METHOD FOR GATHERING, INDEXING, AND SUPPLYING PUBLICLY AVAILABLE DATA CHARTS

(75) Inventors: Nimrod Megiddo, Palo Alto, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 10/034,317

(22) Filed: Dec. 28, 2001

(65) Prior Publication Data

US 2003/0123721 A1 Jul. 3, 2003

(51) Int. Cl.
*G06K 9/62* (2006.01)
(52) U.S. Cl. .............................. 382/159; 700/47; 707/3
(58) Field of Classification Search ................ 382/159; 700/47
See application file for complete search history.

(56) References Cited

U.S. PATENT DOCUMENTS

| | | | |
|---|---|---|---|
| 5,265,242 A | 11/1993 | Fujisawa et al. ............ 395/600 |
| 5,428,694 A | 6/1995 | Betts et al. ................. 382/317 |
| 5,511,159 A | 4/1996 | Baker et al. ................ 395/161 |
| 5,590,220 A | 12/1996 | Takahashi ................... 382/203 |
| 5,628,003 A | 5/1997 | Fujisawa et al. ............ 395/615 |
| 5,761,385 A * | 6/1998 | Quinn ......................... 706/20 |
| 5,794,177 A | 8/1998 | Carus et al. .................... 704/9 |
| 5,794,229 A | 8/1998 | French et al. .................. 707/2 |
| 5,915,038 A * | 6/1999 | Abdel-Mottaleb et al. .. 382/209 |
| 5,918,225 A | 6/1999 | White et al. .................... 707/3 |
| 5,926,824 A | 7/1999 | Hashimoto .................. 707/520 |
| 5,940,825 A | 8/1999 | Castelli et al. ................. 707/6 |
| 5,987,454 A | 11/1999 | Hobbs .......................... 707/4 |
| 6,003,032 A | 12/1999 | Bunney et al. ............... 707/10 |
| 6,003,043 A | 12/1999 | Hatakeyama et al. ........ 707/203 |
| 6,009,422 A | 12/1999 | Ciccarelli ...................... 707/4 |
| 6,065,056 A | 5/2000 | Bradshaw et al. .......... 709/229 |
| 6,125,361 A | 9/2000 | Chakrabarti et al. ........... 707/3 |

(Continued)

OTHER PUBLICATIONS

Gonzalo Navarro and Ricardo Baeza-Yates, "Proximal Nodes: A Model to Query Document Databases by Content and Structure", ACM Transactions on Information Systems, vol. 15, No. 4, Oct. 1997, p. 400-435.

(Continued)

*Primary Examiner*—Samir Ahmed
*Assistant Examiner*—Anand Bhatnagar
(74) *Attorney, Agent, or Firm*—Charles W. Peterson, Jr.; Marc D. McSwain

(57) ABSTRACT

A system, method and search engine for searching images for data contained therein. Training images are provided and image attributes are extracted from the training images. Attributes extracted from training images include image features characteristic of a particular numerically generated image type, such as horizontal lines, vertical lines, percentage white area, circular arcs and text. Then, the training images are classified according to extracted attributes and a particular classifier is selected for each group of training images. Classifiers can include classification trees, discriminant functions, regression trees, support vector machines, neural nets and hidden Markov models. Available images are collected from remotely connected computers, e.g., over the Internet. Collected images are indexed and provided for interrogation by users. As a user enters queries, indexed images are identified and returned to the user. The user may provide additional data as supplemental data to the extracted image data. A chart, representative of the supplemented data, may be generated and provided to the user in response to a particular query.

8 Claims, 2 Drawing Sheets

U.S. PATENT DOCUMENTS

| | | | |
|---|---|---|---|
| 6,128,610 | A | 10/2000 | Srinivasan et al. ............ 707/3 |
| 6,549,660 | B1 * | 4/2003 | Lipson et al. ............... 382/224 |
| 6,751,354 | B2 * | 6/2004 | Foote et al. ................ 382/224 |
| 2001/0003182 | A1 * | 6/2001 | Labelle .......................... 707/3 |
| 2001/0004739 | A1 * | 6/2001 | Sekiguchi et al. .......... 707/100 |
| 2001/0048765 | A1 * | 12/2001 | Yi et al. ..................... 382/165 |
| 2002/0012467 | A1 * | 1/2002 | Shiratani .................... 382/224 |
| 2002/0118883 | A1 * | 8/2002 | Bhatt ......................... 382/224 |
| 2003/0013951 | A1 * | 1/2003 | Stefanescu et al. ......... 600/407 |

OTHER PUBLICATIONS

Jochen Dörre et al., "Text Mining: Finding Nuggets in Mountains of Textual Data", Proceedings of the Fifth ACM SIGKDD International Conference on Knowledge Discovery and Data Mining, Aug. 15-18, 1999, San Diego, CA, p. 398-401.

Jonas S. Karlsson and Martin L. Kersten, "Omega-Storage: A Self Organizing Multi-Attribute Storage Technique for Very Large Main Memories", Technical Report INS-R9910, CWI, Amsterdam, The Netherlands, Sep., 1999.

Owen de Kretser and Alistair Moffat, "Needles and Haystacks: A Search Engine for Personal Information Collections", Proceedings of the 23$^{rd}$ Australasian Computer Science Conference, Canberra, Australia, Feb., 2000, p. 58-65.

* cited by examiner

SYSTEM AND METHOD FOR GATHERING, INDEXING, AND SUPPLYING PUBLICLY AVAILABLE DATA CHARTS

BACKGROUND OF THE INVENTION

1. Field of the Invention

The present invention is related to data mining and, in particular, to retrieval of information stored or located on remotely connected computers, e.g., over the Internet or the world-wide-web.

2. Background Description

The world-wide-web (web) includes a large number of publicly available images that graphically convey numerical information. These images may include things such as charts, graphs, and diagrams, that collectively encompass an enormous amount of information. Typical state of the art search engines (e.g., Alta Vista) build web page indexes and can distinguish embedded images (e.g., files without an extension of .gif or .tif) from text. These search engines may further distinguish between photo images and graphically generated images, but do not analyze the contents of the images themselves. Unfortunately, neither is the information contained in these images indexed. Any indexing provided by existing state of the art search engines is text based, relying only on text included in each particular web page and with any associated image file name. So, information embodied in the images is not readily searchable for users.

The original raw numerical information conveyed by a chart image, for example, and used in creating images such as charts is not always available. Often, the chart or other type of numerical based image is the only available record of the data contained therein. Even if search engines could search chart images, prior art search engines still are of no avail for retrieving or otherwise reproducing the raw data for a particular numerical based image.

Further, even if some raw data is available, not all charted data is available through the web in tabular format. Whatever such tabular data is available is difficult to identify and compare with other charted data, i.e., data that is in image format only. In addition, since a particular chart may be described by a few simple numbers, (e.g., two points describe a straight line) extracting data from an image and converting the extracted data to tabular format could considerably compress the file size, which could in turn save storage space, as well as conserve transmission bandwidth for information that might otherwise only be available in an image file.

Thus, there is a need for locating available data that has been previously embedded and formatted into chart format. There is a further need to extract such data from charts and reformat extracted data into tabular formattable data, for subsequent manipulation and use. Accordingly, there is a clear need for a chart indexing method for quick identification and retrieval and for a system that responds to users' requests to provide charts that display various relationships or that corresponds raw data extracted from web-based charts. More particularly, there is a need for an image search engine or for an image search capability in web search engines.

SUMMARY OF THE INVENTION

Accordingly, it is a purpose of the invention to facilitate chart identification;

It is another purpose of the invention to simplify searching charts and images for data contained therein.

The present invention is a system method and search engine for searching images for data contained therein. Training images are provided and image attributes are extracted from the training images. Attributes extracted from training images include image features characteristic of a particular numerically generated image type, such as horizontal lines, vertical lines, percentage white area, circular arcs and text. Then, the training images are classified according to extracted attributes and a particular classifier is selected for each group of training images. Classifiers can include classification trees, discriminant functions, regression trees, support vector machines, neural nets and hidden Markov models. Available images are collected from remotely connected computers, e.g., over the Internet. Collected images are indexed and provided for interrogation by users. As a user enters queries, indexed images are identified and returned to the user. The user may provide additional data as supplemental data to the extracted image data. A chart, representative of the supplemented data, may be generated and provided to the user in response to a particular query.

BRIEF DESCRIPTION OF THE DRAWINGS

The foregoing and other objects, aspects and advantages will be better understood from the following detailed preferred embodiment description with reference to the drawings, in which.

DESCRIPTION OF PREFERRED EMBODIMENTS

Figure 1:
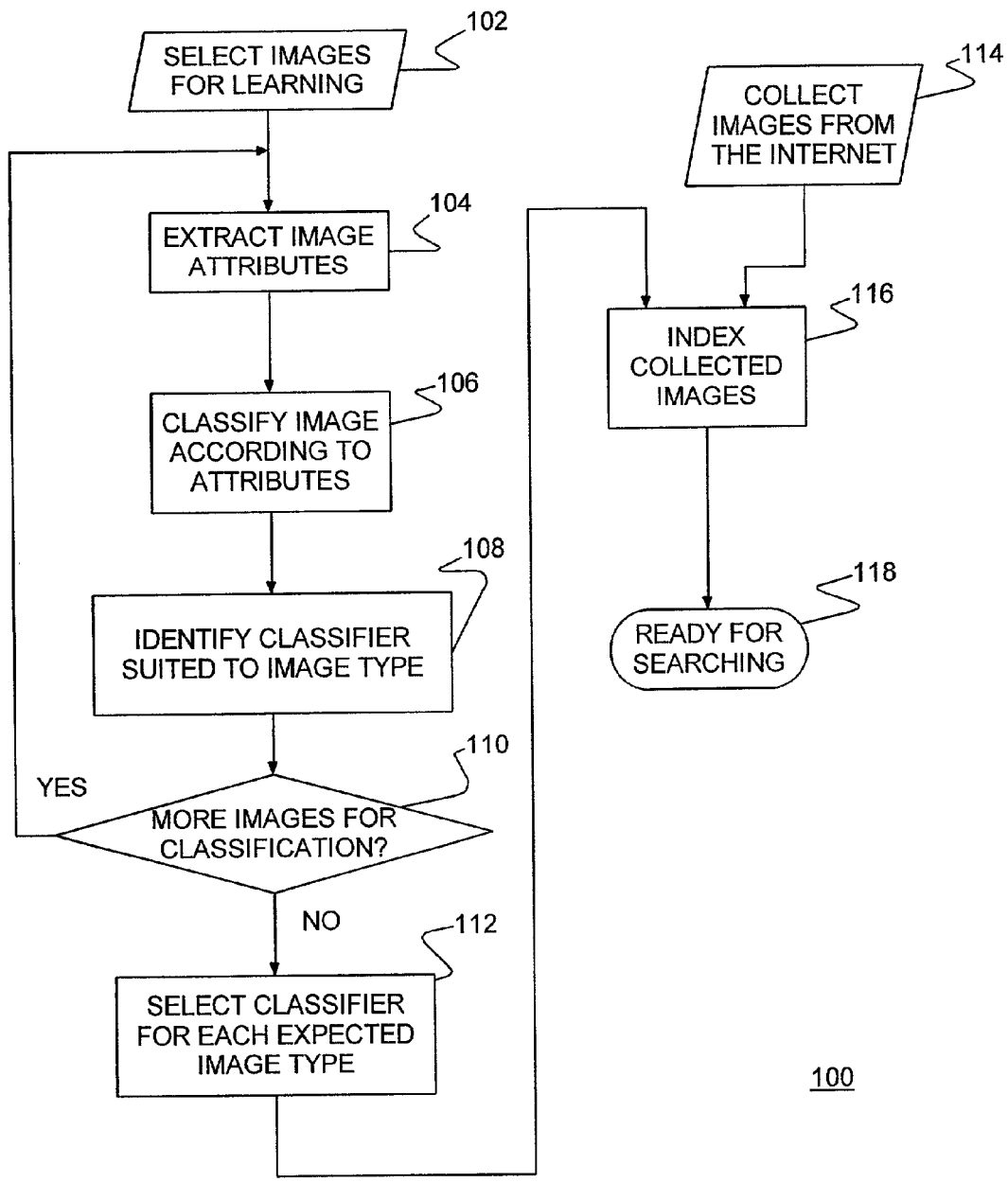
FIG. 1 is a flow diagram for classifying images according to the preferred embodiment of the present invention.

Turning now to the drawings, FIG. 1 is a flow diagram for classifying images according to the preferred embodiment of the present invention which may be practiced on any suitable general purpose computer, e.g., a web server. The preferred embodiment method 100 uses characteristics of informational charts (images) that typically contain text of several informative categories that may be positioned in various chart areas. In particular, these images may be identified only by a uniform resource locator (URL) and retrievable over the Internet or what is known as the "World Wide Web" (web).

For example, a user may enter a query to identify charts that contain a particular word in the title, or charts that contain a certain word in the horizontal axis title. The preferred system separately indexes charts based on text appearing in different areas such as title, axes titles, data labels, etc. The classification engine identifies and associates the main component of each chart and associates recognized chart text with the main components. For this identification and association task, the classification engine may consider the position of the text relative to the chart axes, the relative sizes of characters and of text, as well as the number of words in a particular isolated phrase. Character recognition, in particular optical character recognition (OCR) techniques and other well known machine learning techniques may be employed for identifying text that is likely to be the chart title and then, for extracting the actual title text. The classification engine may identify a chart legend and extract text from it. Similarly, the classification engine may find coordinate axes, if any, and identify corresponding axis titles therefrom. The text of such titles may be extracted, as well as the ranges of data covered by each axis.

First, in step 102, typical candidate images are selected for learning. Those candidate images are presented to the preferred embodiment system, which in step 104 extracts image attributes. As described herein, these image attributes include any image feature which may be attributed to a particular type image such as curved lines for pie charts or rectangular shapes for a bar graph. Data labels may be identified within the chart and text extracted therefrom for indexing the charts. Also, the classification engine recognizes chart features such as curve monotonicity, linearity, convexity, high volatility, and regular periodicity. Also, the types of scales used on the axis are identified and indicate whether for example the chart is linear-linear, log-linear, or log-log. As each of these features is extracted it is attached as an attribute to the chart from which it is extracted.

So, in step 106 various classifiers are applied to each training image to classify the training images. Thus, for the classification and search engine of the present invention, class values are first defined, e.g., as one of "pie chart," "bar chart," "not a chart." First, the preferred embodiment machine classifies each image according to one of these class values, based on "attributes" or "features" that are extracted from the image. Examples of such attributes may include: (i) presence of horizontal and/or vertical lines (with a response value of "yes" or "no"); (ii) a percentage of white (real-value) area; (iii) the presence of circular arcs; (iv) the presence of text. The results from the classification for each classifier are logged. In step 108 the best results are identified to a particular classifier for the particular sample image. Examples of such well known classifiers include classification trees, discriminant functions, regression trees, support vector machines, neural nets and hidden Markov models. This learning phase includes giving the classifier engine a collection of examples, each labeled with its correct class value. The learning engine then selects and builds a classifier for each class that is expected to predict class values of future examples with highest accuracy. This expected accuracy is determined from the learning example results.

In step 110 a check is made to determine if all the sampled images have been provided to the preferred embodiment system, and if more images are available for learning the method returns to step 104 to continue learning. Otherwise in step 112 the best classifier, i.e., the classifier with the highest degree of accuracy for each image type is selected for the particular expected image type. Therefore, the resulting image search engine is provided with a classifier for each different type of expected image customized to the particular type of image, and the likelihood of correct image recognition is significantly increased. Next, in step 114 images are collected from available sources, e.g., any images available over the internet. Then, the preferred embodiment machine selects the class value for the image based on pre-classified examples, using suitable well known classifiers for what is referred to as supervised learning. So, in step 116, the collected images are indexed according to image type and particular selected attributes. Finally in step 118 the preferred embodiment image search engine is provided for searching across the internet.

A well known learning paradigm is typically referred to as the "Classification Problem." See for example, Tom M. Mitchell, Machine Learning, McGraw-Hill, 1997. Generally, the Classification Problem can be explained as follows: Construct a "machine" (i.e., an "algorithm") to predict a class value of a given instance, based on given attributes of the instance. Machine learning has had application to well described data, i.e., unformatted tabular data that includes instances with sufficient attribute notation for such classification. However, where the data includes few classifiable attributes, if any, machine learning has not been generally applied.

The system of the present invention includes a software module that uses machine learning for recognizing the chart type and extracts (pseudo original) raw data from each recognized chart. There are various common types of charts that are produced by common software packages such as, for example, Excel from Microsoft Corporation. The most common chart types are so-called column charts, bar charts, line charts, pie charts, scatter plots, area charts, surface charts, 3-dimensional charts and stock charts displaying variance. Supervised machine learning techniques are used to train the system by providing an advance set of pre-classified charts including hundreds of pre-classified examples. The classification is based on digital image features such as color, edges and texture. In addition to using such general features that facilitate distinguishing charts from photographs, a specific chart type is extracted using chart features, such as for example, axes, circular regions, legends, etc., and as further described herein below.

Advantageously, in the preferred embodiment system, users have a web search engine for searching images on the web for charts by type. For example, a user may specifically initiate a search request for a pie chart that shows a certain distribution. In order to respond to such a query, pie charts must be indexed. So, initial classification may be based on a classifier that includes a pie chart recognition capability, which is a relatively easy classification problem because typical pie charts have attributes that are easy to identify, such as circular arcs, edges that meet at a point, and uniform color fill or areas. Several hundreds of pre-classified example images, labeled as either pie chart or non-pie charts, are used to build a classification tree. For the search, each image is interrogated for these particular attributes and the interrogation results are attached to the image, prior to or coincident with the query. Based on the presence/absence of those attributes, every available chart image may be labeled and indexed as pie chart or a non-pie chart (i.e., another).

In another example a different classifier can be built to recognize block charts. For this example, the distinguishing features may be identified as rectangular regions of uniform texture, fill and/or color. Such distinguishing features may include the number of such regions and the total area each occupies in proportion to the whole image. Having thus built classifiers for each of expected chart types, the collected different classifiers may be applied to images for automatic classification and recognition.

For example, a chart may show the gross domestic product (GDP) of countries as a function of time with a legend provides the names of the countries. These legend words may be used to index the charts. Numbers, such as years, may be associated with the horizontal axis that include for example 1950, 1951, . . . , 1984. An OCR module may be used to extract the numbers and in this example the classification engine determines that the axis range chart includes integers between 1950 and 1984.

Figure 2:
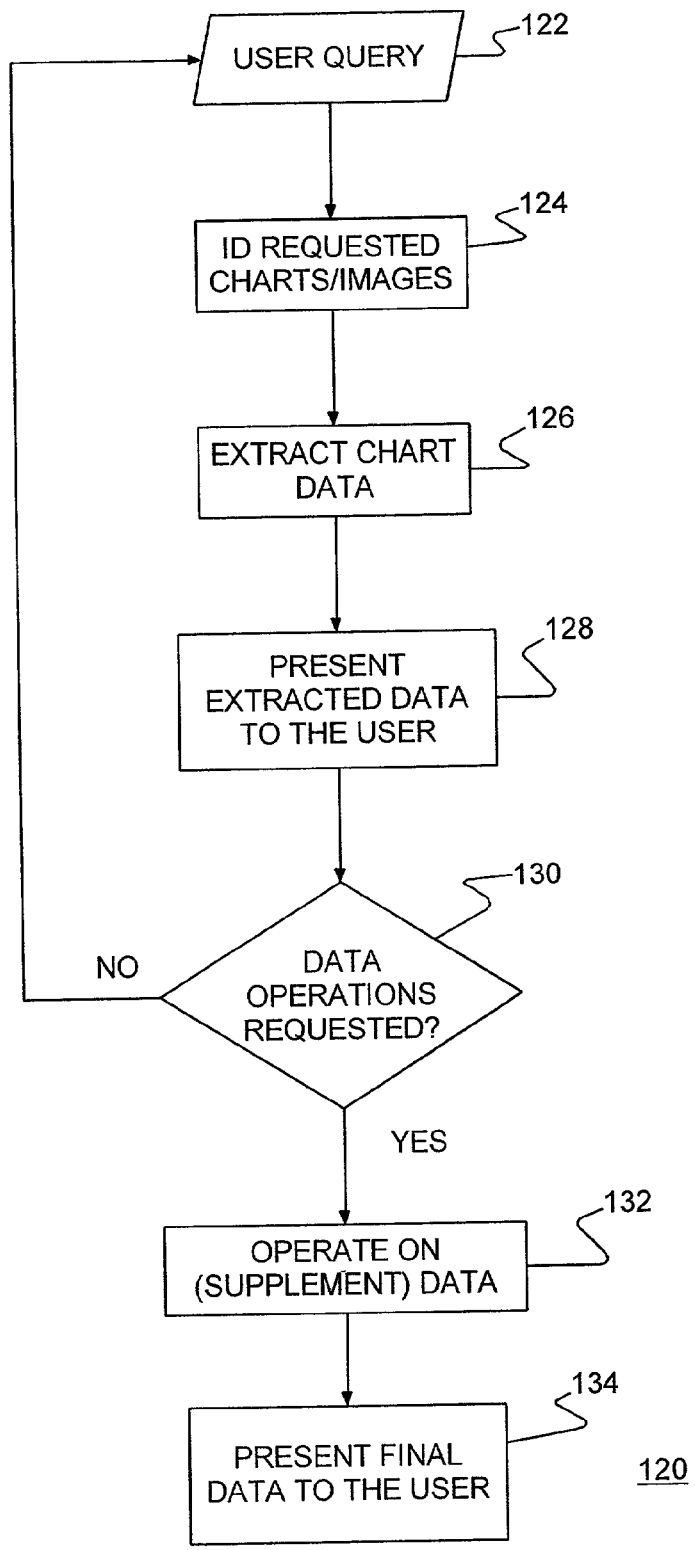
FIG. 2 is an example of a flowchart of an example using the preferred embodiment search engine to search the internet for charts and extract data from the charts and, in particular, combining the extracted data with other data.

FIG. 2 is an example of a flowchart for using the preferred embodiment search engine to search the internet for charts and extract data from the charts and, in particular, for combining the extracted data with other data. In step 122 the user enters a query for a particular type of chart and a particular type of data embodied in the chart, e.g. bar charts comparing GDPs for Japan and the U.S. In step 124 using the chart indexes generated in step 116 of FIG. 1, the relevant charts are identified and retrieved and then presented to the user. Data is extracted from the chart in step 126. A short, simple synopsis of the particular chart is presented to the user with a link to the chart in step 128. The synopsis may include descriptive data extracted as attributes for the particular chart. In step 130 a check is made to determine if the user has requested additional operations on the extracted data. If so, in step 132 those additional operations are conducted and the results of the additional operations are presented to the user in step 134. However, if in step 130 no additional action is indicated, then the user is allowed to enter the next query in step 122.

If ranges of numbers are associated with axes and/or the legend is identified, numerical data may be extracted from charts in step 126. The chart is sampled, a representative table of chart values is extrapolated from the sample and a table is constructed. So, in the foregoing example, the chart may contain the GDP of several countries including the U.S. and Japan during the years 1950–1984, with an extracted table representation that includes three columns: country, year, GDP, each row corresponding to a data point on the chart. Such tables provide the natural way to record the data in a relational database. So, the data extracted in step 126 from existing charts is stored in a database for subsequent use in step 128 and, thus, well known database operations can be performed on the synthesized numerical tables in step 132. Further, new charts corresponding to users' queries can be produced from such tables.

With regard to extracted axis data, errors may be corrected, automatically, using an OCR for example, by recognizing deviations from sequence patterns. Deviations from an arithmetic sequence associated with one axis, can be identified and corrected automatically in step 126. So, continuing the above example, the OCR might detect the following sequence: 1940, 1950, 1960, 1870, 1980, 1990. From this sequence, out of sequence entry, 1870, is easily recognized as an error and automatically corrected to 1970. Furthermore, the classification engine may classify this sequence as linear, related to linear charts; whereas, the sequence 0.1, 1, 10, 100, 1000 may be recognized, automatically, as logarithmic.

Additionally, once data is extracted from charts and stored in databases, that data can be subsequently combined with other time-series data to produce new charts. Continuing the above example, chart data extracted for the GDP of U.S. and Japan between the years 1950–1984 can be supplemented with tabular GDP data for the U.S. and Japan from 1984 to the present in a single table that may be used to generate a single chart that conveys the GDP for the last half century. Further, more complex charts, such as bar charts that compare the GDP of various countries in a particular year, may be generated from the GDP growth charts of individual countries.

Thus, the present invention is a classification and search engine for image based searching, providing search results for search queries over a much broader range of data than was heretofore available using state of the art web search engines. The system of the present invention improves information identification and retrieval, especially for finding information embodied in or embedded in images that may be widely distributed and located at remote locations, e.g., located at remotely located computers. Accordingly, image and chart indexing is improved, thereby improving the quality of the chart retrieval results. Features of each image or chart itself are interrogated and exploited, rather than just using the file names or URLs of chart files or other text or hypertext markup language (HTML) pointing to or associated with the image.

While the invention has been described in terms of preferred embodiments, those skilled in the art will recognize that the invention can be practiced with modification within the spirit and scope of the appended claims.

What is claimed is:

1. A method of searching images for data contained within said images, said method comprising the steps of:
   providing a plurality of training images including groups of one or more of charts selected from a plurality of known charts consisting of column charts, bar charts, line charts, pie charts, scatter charts, area charts, surface charts, and three-dimensional charts;
   extracting image attributes from said training images by identifying image features characteristic of a particular numerically generated image type;
   classifying training images according to said extracted attributes;
   selecting a particular classifier for each group of training images;
   collecting a plurality of images available from remotely connected computers;
   indexing said collected images; and
   providing an index of said collected images for interrogation by users.

2. A method as in claim 1 wherein the step of extracting attributes identifies image features and assigns any identified image features as attributes, said image features including horizontal lines, vertical lines, percentage of white area, circular arcs and text.

3. A method as in claim 1 wherein the step of classifying images comprises providing image attributes for each image to a plurality of classifiers, said plurality of classifiers being selected from the group consisting of classification trees, discriminant functions, regression trees, support vector machines, neural nets and hidden Markov models.

4. A method as in claim 3 wherein one of said classifiers is selected for each chart type.

5. A method as in claim 3 wherein said collected images are indexed in the indexing step by extracting attributes and providing extracted attributes to said classifiers, said classifiers identifying an image type, said images being indexed according to said attributes and said image type.

6. A method of extracting data from images located on remotely connected machines, said images having been indexed according to claim 5, said method comprising the steps of:
   receiving a query from a user;
   identifying indexed images responsive to said query; and
   presenting identified images to said user in response to said query.

7. A method as in claim 6 wherein prior to presenting identified images to the user, chart data is extracted from the images and the extracted chart data is presented to the user, the user being allowed to select images for viewing.

8. A method as in claim 7 further comprising the steps of:
   providing additional data as supplemental data to said extracted chart data; and
   generating a chart representative of supplemented data, said generated chart being provided responsive to said query.

* * * * *